(12) United States Patent
Kalekar et al.

(10) Patent No.: US 9,251,020 B1
(45) Date of Patent: Feb. 2, 2016

(54) SYSTEMS AND METHODS FOR FILE-LEVEL REPLICATION

(71) Applicants: Santosh Kalekar, Maharashtra (IN); Makarand Chatur, Maharashtra (IN)

(72) Inventors: Santosh Kalekar, Maharashtra (IN); Makarand Chatur, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 623 days.

(21) Appl. No.: 13/646,858

(22) Filed: Oct. 8, 2012

(51) Int. Cl.
*G06F 11/20* (2006.01)
*G06F 17/30* (2006.01)

(52) U.S. Cl.
CPC ...... *G06F 11/2066* (2013.01); *G06F 17/30212* (2013.01)

(58) Field of Classification Search
CPC ............ G06F 11/2056; G06F 11/2066; G06F 11/2071; G06F 2201/2094
See application file for complete search history.

(56) References Cited

U.S. PATENT DOCUMENTS

2004/0039756 A1* 2/2004 Bromley ........................ 707/200

OTHER PUBLICATIONS

Marathon Technologies Corporation; Competitive Guide; http://das-ueberall-buero.de/shop/doclib/Competitive_Guide_v3.pdf; Jul. 2008.
Onuora Amobi; Windows Server 8 Hyper V 3.0; http://www.windows8update.com/2011/09/30/windows-server-8-hyper-v-3-0/; Sep. 30, 2011.
W. H. Highleyman; Neverfail for Windows Applications; The Availability Digest; Jun. 2010.
AMTSoftware; Double Take FAQ; d. http://www.amtsoftware.com/Double-Take/docs/FAQ; Jul. 2012.
Tim Warden; DR and Asynchronous Replication—Tutorial and Best Practices; Las Solanas Consulting; e. http://www.las-solanas.com/storage_virtualization/asynchronous_replication.php; Taken from site on Aug. 23, 2012.
File Replication Pro; File Replication Pro—Real Time, Secure, Offsite Backup and File Sync; f. http://www.filereplicationpro.com/open-file-manager.cfm, Taken from site on Aug. 23, 2012.
Open Minds; Windows Data Replication, Data Mirroring, Replicating Data Over a LAN or WAN; g. http://www.openminds.co.uk/windows-solutions/data-replication/datareplicationmore-information.html; 2008.
Jerome M. Wendt; File and Block Based Replication, Sometimes you need both; h. http://inmage.dcig.com/2008/08/file-and-block-based-replicati.htm; Aug. 4, 2008.
Dilip Ranade, Systems and Methods for Replicating Data in Cluster Environments; U.S. Appl. No. 12/947,017, filed Nov. 16, 2010.

* cited by examiner

*Primary Examiner* — Gary W Cygiel
(74) *Attorney, Agent, or Firm* — ALG Intellectual Property, LLC

(57) ABSTRACT

A computer-implemented method for file-level replication may include 1) identifying a selection of at least one source file to replicate from a primary volume to a secondary volume, 2) identifying extent information that indicates a volume location of the source file within the primary volume, 3) identifying a volume offset within the primary volume of a write operation performed on the source file within the primary volume, 4) converting the volume offset to a file offset within the source file using the extent information, and 5) replicating the write operation and the file offset to the secondary volume. Various other methods and systems are also disclosed.

20 Claims, 8 Drawing Sheets

SYSTEMS AND METHODS FOR FILE-LEVEL REPLICATION

BACKGROUND

Many organizations rely upon data replication to improve the reliability, fault-tolerance, and/or accessibility of their applications and/or data. Data replication typically involves replicating data from a primary site or device (e.g., a production volume) to a secondary (e.g., backup and/or disaster recovery) site or device.

Many traditional replication systems may replicate data at the volume level (e.g., replicate a specified volume from a primary site to a secondary site). However, in some cases a replication administrator may wish to only replicate certain files within a volume (e.g., selected virtual hard disk files within a virtualization environment). While some traditional replication systems may replicate data at the file level, these replication systems may lack features, robustness, performance, quality of service, and/or ease of use of existing volume-level replication systems. Unfortunately, replication administrators who would prefer to perform file-specific replication may therefore face an undesirable dilemma of choosing between a powerful and robust volume-level replication system and a file-level replication system. Accordingly, the instant disclosure identifies and addresses a need for additional and improved systems and methods for file-level replication.

SUMMARY

As will be described in greater detail below, the instant disclosure generally relates to systems and methods for file-level replication by filtering file operations for specified files on primary volumes, converting these operations to specify file offsets (e.g., from volume offsets), and replicating the converted operations to secondary volumes. In one example, a computer-implemented method for file-level replication may include 1) identifying a selection of at least one source file to replicate from a primary volume to a secondary volume, 2) identifying extent information that indicates a volume location of the source file within the primary volume, 3) identifying a volume offset within the primary volume of a write operation performed on the source file within the primary volume, 4) converting the volume offset to a file offset within the source file using the extent information, and 5) replicating the write operation and the file offset to the secondary volume.

In some examples, identifying the selection of the source file may include configuring a file system filter driver to identify future file operations performed on the source file.

In some embodiments, identifying the extent information may include receiving the extent information from a file system driver. In one example, the computer-implemented method may also include 1) identifying new extent information that indicates a change in a size of the source file on the primary volume and 2) transmitting the new extent information to the secondary volume.

In one embodiment, the computer-implemented method may also include 1) identifying an additional write operation performed on the primary volume, 2) comparing the additional write operation to the extent information and determining, based on the extent information, that the additional write operation does not apply to the source file, and 3) preventing replication of the additional write operation to the secondary volume based on determining that the additional write operation does not apply to the source file.

In some examples, an additional method for file-level replication may include: 1) identifying a target file on a secondary volume as a replicated version of a source file on a primary volume, 2) receiving a replicated write operation to apply to the target file on the secondary volume, 3) identifying extent information that indicates a volume location of the target file within the secondary volume, 4) identifying a file offset of the replicated write operation, 5) converting the file offset to a volume offset of the replicated write operation within the secondary volume using the extent information, and 6) applying the replicated write operation on the secondary volume using the volume offset.

In some embodiments, the secondary volume may be mounted to allow read operations and write operations for replication. In one example, the additional computer-implemented method may also include 1) receiving new extent information that indicates a change in the size of the source file on the primary volume and 2) modifying the target file on the secondary volume to match the source file on the primary volume based on the new extent information. In one embodiment, receiving the new extent information may include configuring a file system filter driver to receive the new extent information for modifying the target file.

In some embodiments, the additional computer-implemented method may also include 1) identifying a failover of the primary volume to the secondary volume and 2) reconfiguring the file system filter driver to intercept file operations that change metadata of the target file to replicate to a new secondary volume in response to identifying the failover.

In one embodiment, a system for implementing the above-described method may include 1) an identification module programmed to identify a selection of at least one source file to replicate from a primary volume to a secondary volume, 2) a location module programmed to identify extent information that indicates a volume location of the source file within the primary volume, 3) an offset module programmed to identify a volume offset within the primary volume of a write operation performed on the source file within the primary volume, 4) a conversion module programmed to convert the volume offset to a file offset within the source file using the extent information, and 5) a replication module programmed to replicate the write operation and the file offset to the secondary volume. The system may also include at least one processor configured to execute the identification module, the location module, the offset module, the conversion module, and the replication module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
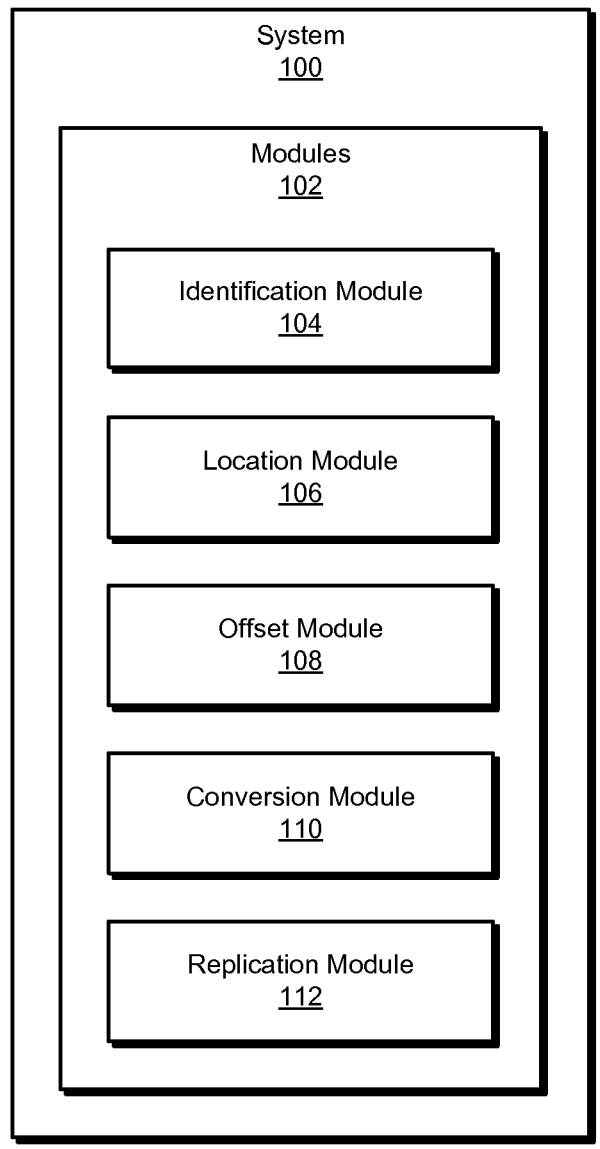
FIG. 1 is a block diagram of an exemplary system for file-level replication.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for file-level replication. As will be explained in greater detail below, by filtering file operations for specified files on primary volumes, converting these operations to specify file offsets (e.g., from volume offsets), and replicating the converted operations to secondary volumes, the system and methods described herein may achieve file-level replication using existing volume-level replication technologies. For example, existing volume-level replication systems may be adapted with minimal change for file-level replication, thereby allowing file-level replication with volume-level replication systems that may provide features, robustness, performance, quality of service, and/or ease of use that may be unavailable with some traditional dedicated file-level replication systems.

The following will provide, with reference to FIGS. 1, 2, 4, and 6, detailed descriptions of exemplary systems for file-level replication. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for file-level replication. As illustrated in this figure, exemplary system 100 may include one or more modules 102 for performing one or more tasks. For example, and as will be explained in greater detail below, exemplary system 100 may include an identification module 104 programmed to identify a selection of at least one source file to replicate from a primary volume to a secondary volume. Exemplary system 100 may also include a location module 106 programmed to identify extent information that indicates a volume location of the source file within the primary volume.

In addition, and as will be described in greater detail below, exemplary system 100 may include an offset module 108 programmed to identify a volume offset within the primary volume of a write operation performed on the source file within the primary volume. Exemplary system 100 may also include a conversion module 110 programmed to convert the volume offset to a file offset within the source file using the extent information. Exemplary module 100 may additionally include a replication module 112 programmed to replicate the write operation and the file offset to the secondary volume. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., primary system 202 and/or secondary system 206), the devices illustrated in FIG. 4, (e.g., primary system 402 and/or secondary system 426), the devices illustrated in FIG. 6 (e.g., primary system 602, secondary system 606, and/or tertiary system 608), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Figure 2:
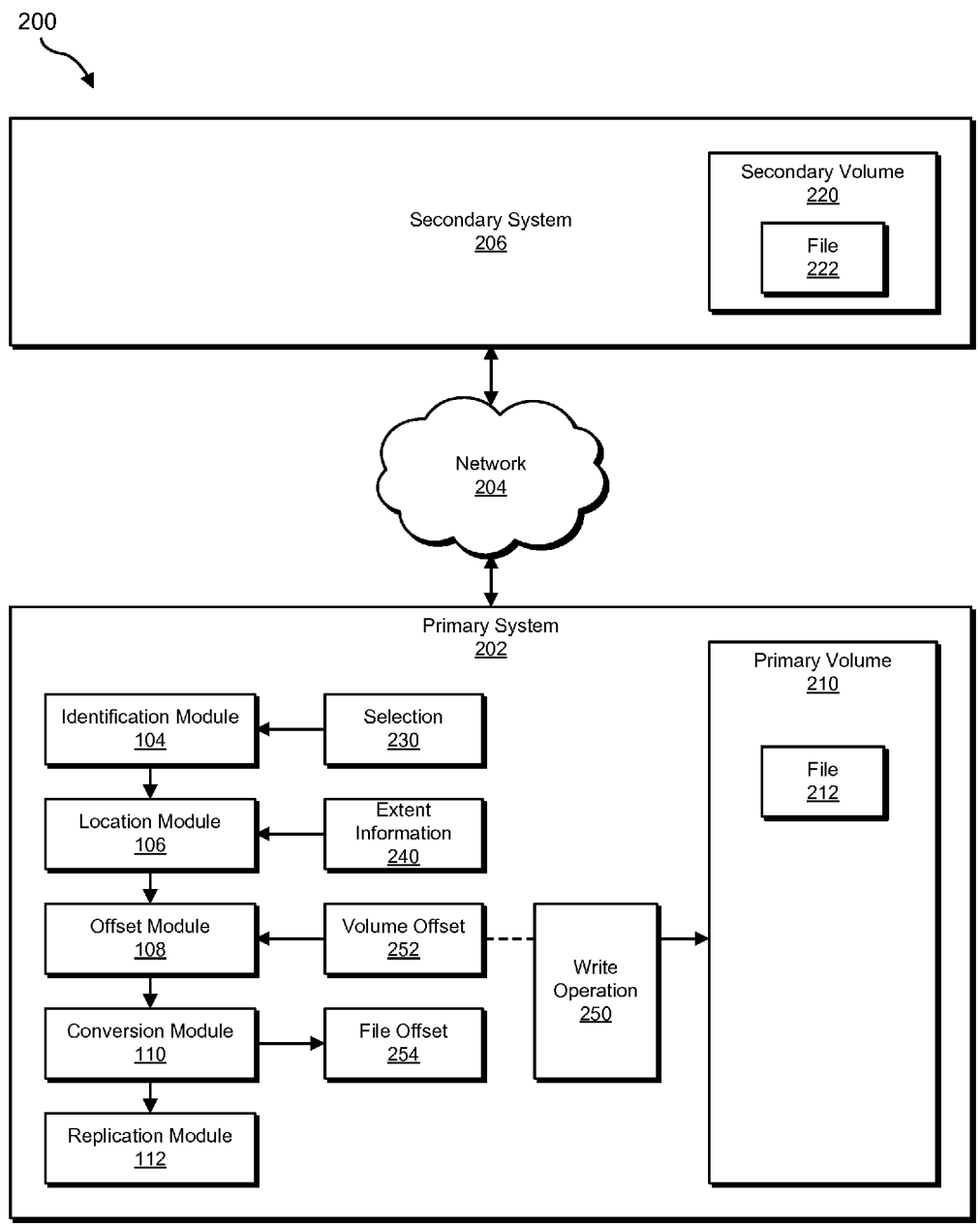
FIG. 2 is a block diagram of an exemplary system for file-level replication.

Exemplary system 100 in FIG. 1 may be implemented in a variety of ways. For example, all or a portion of exemplary system 100 may represent portions of exemplary system 200 in FIG. 2. As shown in FIG. 2, system 200 may include a primary system 202 in communication with a secondary system 206 via a network 204. Primary system 202 may be programmed with one or more of modules 102. Additionally or alternatively, secondary system 206 may be programmed with one or more of modules 102.

In one embodiment, one or more of modules 102 from FIG. 1 may, when executed by at least one processor of primary system 202 and/or secondary system 206, facilitate primary system 202 and/or secondary system 206 in file-level replication. In one example, primary system 202 may be configured to replicate one or more files from a primary volume 210 to a secondary volume 220 of secondary system 206. For example, and as will be described in greater detail below, one or more of modules 102 may cause primary system 202 and/or secondary system 206 to 1) identify a selection 230 of one or more files (including a file 212) to replicate from primary volume 210 to secondary volume 220, 2) identify extent information 240 that indicates the volume location of file 212 within primary volume 210, 3) identify a volume offset 252 within primary volume 210 of a write operation 250 performed on file 212 within primary volume 210, 4) convert volume offset 252 to a file offset 254 within file 212 using extent information 240, and 5) replicate write operation 250 and file offset 254 to secondary volume 220 (e.g., to a file 222 that is a replica of file 212).

Primary system 202 generally represents any type or form of computing device capable of reading computer-executable instructions. Examples of primary system 202 include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device. In some examples, primary system 202 may represent a computing device configured to replicate data.

As illustrated in FIG. 2, exemplary system 200 may also include primary volume 210. Primary volume 210 may be configured to store any information that may be replicated. In one example, primary volume 210 may store virtual disk files. Primary volume 210 may represent portions of a single storage device or a plurality of storage devices. For example, primary volume 210 may represent a portion of primary system 202 in FIG. 2, computing system 710 in FIG. 7, and/or portions of exemplary network architecture 800 in FIG. 8. Alternatively, primary volume 210 in FIG. 2 may represent at least a portion one or more physically separate devices capable of being accessed by a computing device, such as primary system 202 in FIG. 2, computing system 710 in FIG. 7, and/or portions of exemplary network architecture 800 in FIG. 8.

Secondary system 206 generally represents any type or form of computing device capable of reading computer-executable instructions. Examples of secondary system 206 include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device. In some examples, secondary system 206 may represent a computing device configured to receive, manage, and/or access replicated data.

As illustrated in FIG. 2, exemplary system 200 may also include secondary volume 220. In some examples, secondary volume 220 may be configured to store replicated data. In one example, secondary volume 220 may store replicated virtual disk files. Secondary volume 220 may represent portions of a single storage device or a plurality of storage devices. For example, secondary volume 220 may represent a portion of secondary system 206 in FIG. 2, computing system 710 in FIG. 7, and/or portions of exemplary network architecture 800 in FIG. 8. Alternatively, secondary volume 220 in FIG. 2 may represent at least a portion one or more physically separate devices capable of being accessed by a computing device, such as secondary system 206 in FIG. 2, computing system 710 in FIG. 7, and/or portions of exemplary network architecture 800 in FIG. 8.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between primary system 202 and secondary system 206.

Figure 3:
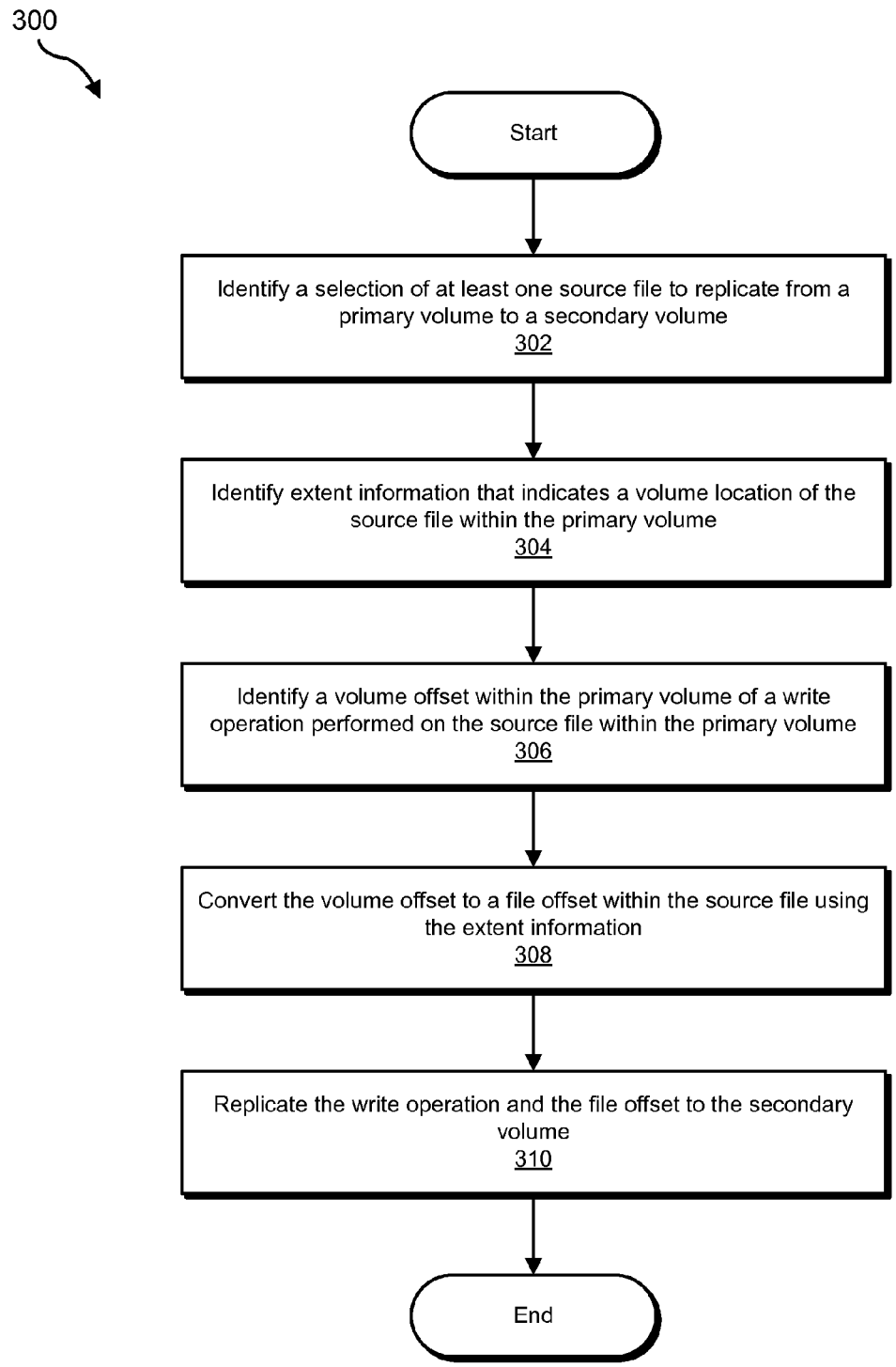
FIG. 3 is a flow diagram of an exemplary method for file-level replication.

FIG. 3 is a flow diagram of an exemplary computer-implemented method 300 for file-level replication. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, system 600 in FIG. 6, computing system 710 in FIG. 7, and/or portions of exemplary network architecture 800 in FIG. 8.

As illustrated in FIG. 3, at step 302 one or more of the systems described herein may identify a selection of at least one source file to replicate from a primary volume to a secondary volume. For example, at step 302 identification module 104 may, as part of primary system 202 in FIG. 2, identify selection 230 of one or more files (including file 212) to replicate from primary volume 210 to secondary volume 220.

As used herein, the term "file" may refer to any unit of data, including, without limitation, files, directories, data objects, records, database entries, and documents. In one example, the source file may include a virtual disk file. As used herein, the term "volume" may refer to any distinctly identifiable collection of data. In some examples, the volume may correspond to a logical storage unit used by a file system to store one or more files. In some examples, the term "volume" may refer to an addressable storage space capable of storing files. By way of example, the term "volume" may refer to a volume managed by a logical volume manager such as LOGICAL DISK MANAGER or VERITAS VOLUME MANAGER.

As used herein, the term "replication" may refer to any scheme for maintaining an up-to-date copy of a collection of data. In some examples, one or more of the systems described herein may perform continuous replication. As used herein, the phrase "continuous replication" may refer to any service for providing continuous and/or real-time backup services (e.g., by replicating each transaction and/or operation synchronously and/or near-synchronously). Accordingly, as used herein, the phrase "primary volume" may refer to any volume from which data is replicated, and the phrase "secondary volume" may refer to any volume to which data is replicated. Likewise, the phrase "source file" may refer to any file to be replicated and the phrase "target file" may refer to any replica file.

Identification module 104 may identify the selection in any suitable manner. For example, identification module 104 may identify the selection by reading a configuration file (e.g., created by a replication administrator) specifying the files of a volume to be replicated. Additionally or alternatively, identification module 104 may identify one or more rules defining the selection and identify one or more files on the primary volume meeting the specified rules.

In some examples, one or more of the systems described herein may operate as a part of a volume manager driver. For example, one or more of the systems described herein may, when installed as a part of a volume manager driver, may modify the operation of a volume-level replication system to perform file-level replication. In one example, identification module 104 may configure a volume manager driver to identify future file operations performed on the source file (e.g., upon identifying the source file within the selection).

In some examples, one or more of the systems described herein may operate as a part of a file system driver. As used herein, the phrase "file system driver" may refer to any driver used to provide functionality for a file system. In some examples, the phrase "file system driver" may refer to a file system filter driver. As used herein, the phrase "filter driver" may refer to any driver configured to add functionality for a device and/or system without replacing a primary driver for the device and/or system. Accordingly, the phrase "file system filter driver" may refer to any driver configured to add functionality to a file system. In some examples, one or more of the systems described herein may, as part of a file system driver, intercept file operations configured to change the size of a file. For example, these file operations may include resizing operations, allocation operations, deallocation operations, deletion operations, etc.

Returning to FIG. 3, at step 304 one or more of the systems described herein may identify extent information that indicates a volume location of the source file within the primary volume. For example, at step 304 location module 106 may, as part of primary system 202 in FIG. 2, identify extent information 240 that indicates the volume location of file 212 within primary volume 210.

As used herein, the phrase "extent information" may refer to any information useful for locating a file within a volume. For example, the phrase "extent information" may refer to information identifying one or more contiguous portions of storage allocated for a file within a volume. As used herein, the phrase "volume location" may refer to any information describing the location of a file within a volume (including, e.g., a starting location of the file within the volume, a starting location of one or more extents of the file within the volume, and/or a size of one or more extents of the file within the volume, etc.).

Location module 106 may identify the extent information in any suitable manner. In some examples, location module 106 may receive the extent information from a file system filter driver. Additionally or alternatively, location module 106 may identify the extent information as a part of a file system filter driver.

In some examples, the extent information of the source file may change. For example, the source file may be resized. Accordingly, in some examples, location module 106 may identify new extent information that indicates a change in the size of the source file on the primary volume. In these examples, location module 106 may also transmit the new extent information to the secondary volume (e.g., replicating the new extent information to be applied to a replica of the source file on the secondary volume).

Returning to FIG. 3, at step 306 one or more of the systems described herein may identify a volume offset within the primary volume of a write operation performed on the source file within the primary volume. For example, at step 306 offset module 108 may, as part of primary system 202 in FIG. 2, identify volume offset 252 within primary volume 210 of a write operation 250 performed on file 212 within primary volume 210.

As used herein, the phrase "volume offset" may refer to any offset and/or location relative to a volume (e.g., an address and/or location within a volume). Offset module 108 may identify the volume offset of the write operation in any suitable manner. For example, offset module 108 may identify the volume offset of the write operation by intercepting the write operation as a part of a volume manager and identifying the location within the volume to which the write operation is to apply.

In some examples, one or more of the systems described herein may identify other write operations not to be replicated. For example, offset module 108 may identify an additional write operation performed on the primary volume and compare the additional write operation to the extent information. Offset module 108 may then determine, based on the extent information, that the additional write operation does not apply to the source file. Likewise, offset module 108 may compare the additional write operation to extent information of other files within the selection of files set for replication (and/or to a data structure combining such extent information) to determine that the additional write operation does not apply to any file set for replication.

Returning to FIG. 3, at step 308 one or more of the systems described herein may convert the volume offset to a file offset within the source file using the extent information. For example, at step 308 conversion module 110 may, as part of primary system 202 in FIG. 2, convert volume offset 252 to file offset 254 within file 212 using extent information 240.

As used herein, the phrase "file offset" may refer to any offset and/or location relative to a file (e.g., a location and/or offset within a file). Conversion module 110 may convert the volume offset to the file offset using the extent information in any suitable manner. For example, conversion module 110 may identify an extent map (e.g., retrieved by conversion module 110 from a file system) that maps volume offsets (e.g., Logical Cluster Numbers) to file offsets (e.g., Virtual Cluster Numbers). In this example, conversion module 110 may convert the volume offset using the extent map. As another example, conversion module 110 may subtract the volume offset of the write operation from a volume location of an extent to which the write operation applies to determine an offset within the extent and then, in some examples, add a file offset of the extent to the determined offset of the extent to identify the file offset. Additionally or alternatively, where the source file includes a single extent, conversion module 110 may simply subtract the volume location of the beginning of the single extent from the volume offset of the write operation to determine the file offset.

Returning to FIG. 3, at step 310 one or more of the systems described herein may replicate the write operation and the file offset to the secondary volume. For example, at step 310 replication module 110 may, as part of primary system 202 in FIG. 2, replicate write operation 250 and file offset 254 to secondary volume 220 (e.g., to file 222 that is a replica of file 212).

Replication module 110 may replicate the write operation in any suitable manner. In some examples, replication module 110 may replicate the write operation by providing the write operation (e.g., with information identifying the source file and the file offset) to a volume-level replication system to replicate. As will be explained in greater detail below, at the secondary site one or more of the systems described herein may convert the replicated write operation to a volume-based operation for the volume-level replication system to handle at the secondary site.

As mentioned earlier, in some examples, one or more of the systems described herein may have identified an additional write operation performed on the primary volume that does not apply to the source file (or any other file within the selection of files to replicate). In these examples, replication module 110 may prevent replication of the additional write operation to the secondary volume based on determining that the additional write operation does not apply to the source file.

After step 310, method 300 may terminate.

Figure 4:
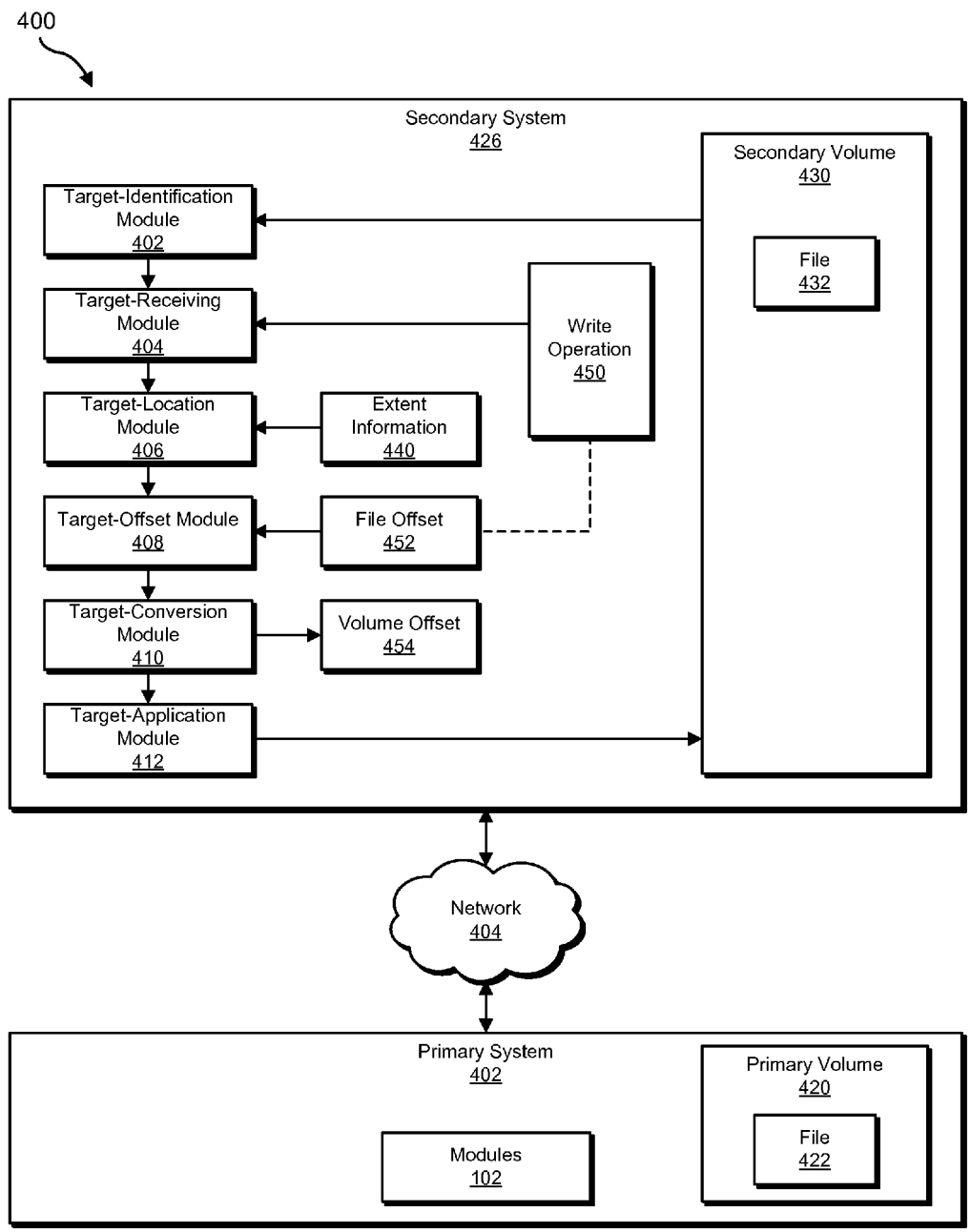
FIG. 4 is a block diagram of an exemplary system for file-level replication.

FIG. 4 illustrates an exemplary system 400 for file-level replication. As shown in FIG. 4, exemplary system 400 may include a primary system 402 in communication with a secondary system 426 via a network 404. For example, primary system 402 may be configured with a volume-level replication system and/or modules 102 to replicate a selection of files from a primary volume 420 to a secondary volume 430 (e.g., including replicating a file 422 to a replica file 432). As will be explained below, one or more of the modules illustrated on secondary system 426 (e.g., a target-identification module 402, a target-receiving module 404, a target-location module 406, a target-offset module 408, a target-conversion module 410, and/or a target-application module 412) may receive replication information for file 422 from primary system 402 and apply the replication information to file 432.

Figure 5:
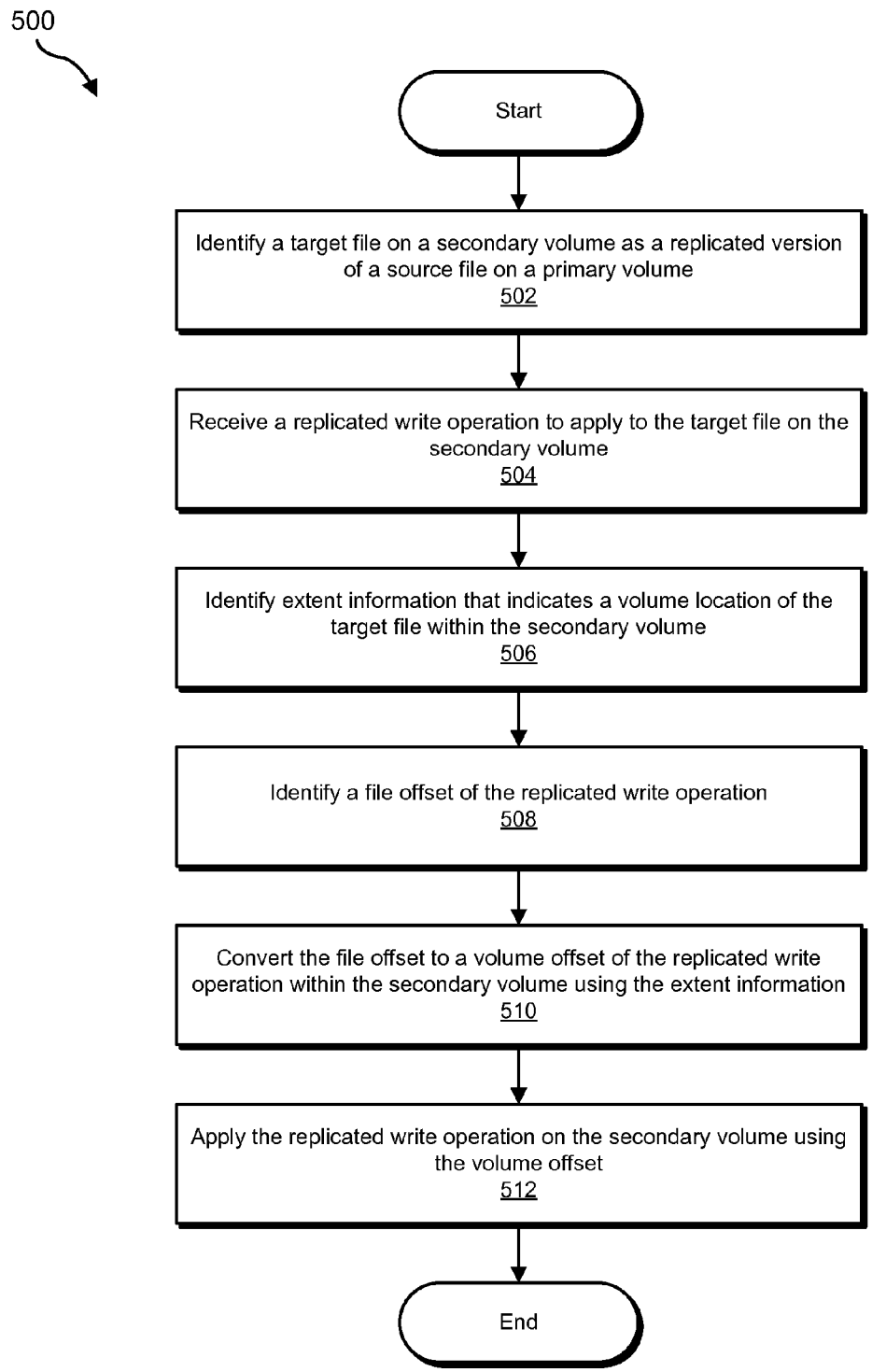
FIG. 5 is a flow diagram of an exemplary method for file-level replication.

FIG. 5 is a flow diagram of an exemplary computer-implemented method 500 for file-level replication. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, system 400 in FIG. 4, system 600 in FIG. 6, computing system 710 in FIG. 7, and/or portions of exemplary network architecture 800 in FIG. 8.

As illustrated in FIG. 5, at step 502 one or more of the systems described herein may identify a target file on a secondary volume as a replicated version of a source file on a primary volume. For example, at step 502 target-identification module 402 may, as part of secondary system 426 in FIG.

4, identify file 432 on secondary volume 430 as a replicated version of file 422 on primary volume 420.

Target-identification module 402 may identify the target file as the replicated version of the source file in any suitable manner. For example, target-identification module 402 may identify a file name of the target file matching and/or corresponding to a file name of the source file. Additionally or alternatively, target-identification module 402 may look up the target file based on an identifier of the source file.

In some examples, the secondary volume may be mounted to allow read operations and write operations for replication. For example, target-identification module 402 may mount the secondary volume as read/write. Target-identification module 402 may configure the secondary volume to be writable for replication operations (e.g., including replicated file metadata such as file size information). In at least one example, the target file may be opened in exclusive mode and/or non-cached mode. For example, target-identification module 402 may open the target file in exclusive mode and non-cached mode (e.g., to avoid data inconsistency and/or adversely affecting cache coherency).

Returning to FIG. 5, at step 504 one or more of the systems described herein may receive a replicated write operation to apply to the target file on the secondary volume. For example, at step 504 target-receiving module 404 may, as part of secondary system 426 in FIG. 4, receive a replicated write operation 450 to apply to file 432 on secondary volume 430.

Target-receiving module 404 may receive the replicated write operation in any suitable manner. In some examples, target-receiving module 404 may receive the replicated write operation through and/or as a part of a volume replication agent. As will be explained in greater detail below, in some examples the replicated write operation may not be performed via a file system, but instead be performed as a volume-level operation (e.g., via a volume-level replication agent).

Returning to FIG. 5, at step 506 one or more of the systems described herein may identify extent information that indicates a volume location of the target file within the secondary volume. For example, at step 506 target-location module 406 may, as part of secondary system 426 in FIG. 4, identify extent information 440 that indicates a volume location of file 432 within secondary volume 430.

Target-location module 406 may identify the extent information for the target file in any suitable manner. For example, target-location module 406 may identify the extent information of the target file by receiving the extent information from a file system driver. Additionally or alternatively, target-location module 406 may identify the extent information as a part of a file system filter driver.

As mentioned earlier, one or more of the systems described herein may transmit extent information for the source file, including, e.g., any changes to the extent information of the source file, from the primary site to the secondary site. Accordingly, target-location module 406 may receive new extent information that indicates a change in a size of the source file on the primary volume. Target-location module 406 may then modify the target file on the secondary volume to match the source file on the primary volume based on the new extent information. For example, target-location module 406 may use a file system application programming interface to update metadata for the target file (e.g., to grow or truncate the target file).

Returning to FIG. 5, at step 508 one or more of the systems described herein may identify a file offset of the replicated write operation. For example, at step 508 target-offset module 408 may, as part of secondary system 426 in FIG. 4, identify a file offset 452 of write operation 450.

Target-offset module 408 may identify the file offset of the replicated write operation in any suitable manner. For example, target-offset module 408 may identify the file offset of the replicated write operation within the replicated write operation.

Returning to FIG. 5, at step 510 one or more of the systems described herein may convert the file offset to a volume offset of the replicated write operation within the secondary volume using the extent information. For example, at step 510 target-conversion module 410 may, as part of secondary system 426 in FIG. 4, convert file offset 452 to a volume offset 454 of write operation 450 within secondary volume 430 using extent information 440.

Target-conversion module 410 may convert the file offset to the volume offset using the extent information in any suitable manner. For example, conversion module 110 may add the file offset to a volume offset of the extent of the target file. Additionally or alternatively, where the file includes multiple extents, conversion module 110 may subtract the size of each extent from the file offset until reaching an extent larger than the remaining file offset and add the remaining file offset to the volume offset of the extent.

Returning to FIG. 5, at step 512 one or more of the systems described herein may apply the replicated write operation on the secondary volume using the volume offset. For example, at step 512 target-application module 412 may, as part of secondary system 426 in FIG. 4, apply write operation 450 on secondary volume 430 using volume offset 454.

Target-application module 412 may apply the write operation using the volume offset in any suitable manner. For example, target-application module 412 may apply the write operation at the volume level (e.g., instead of via a file system operation). In some examples, target-application module 412 may apply the write operation by providing the write operation to a volume-level replicator as input.

After step 512, method 500 may terminate.

Figure 6:
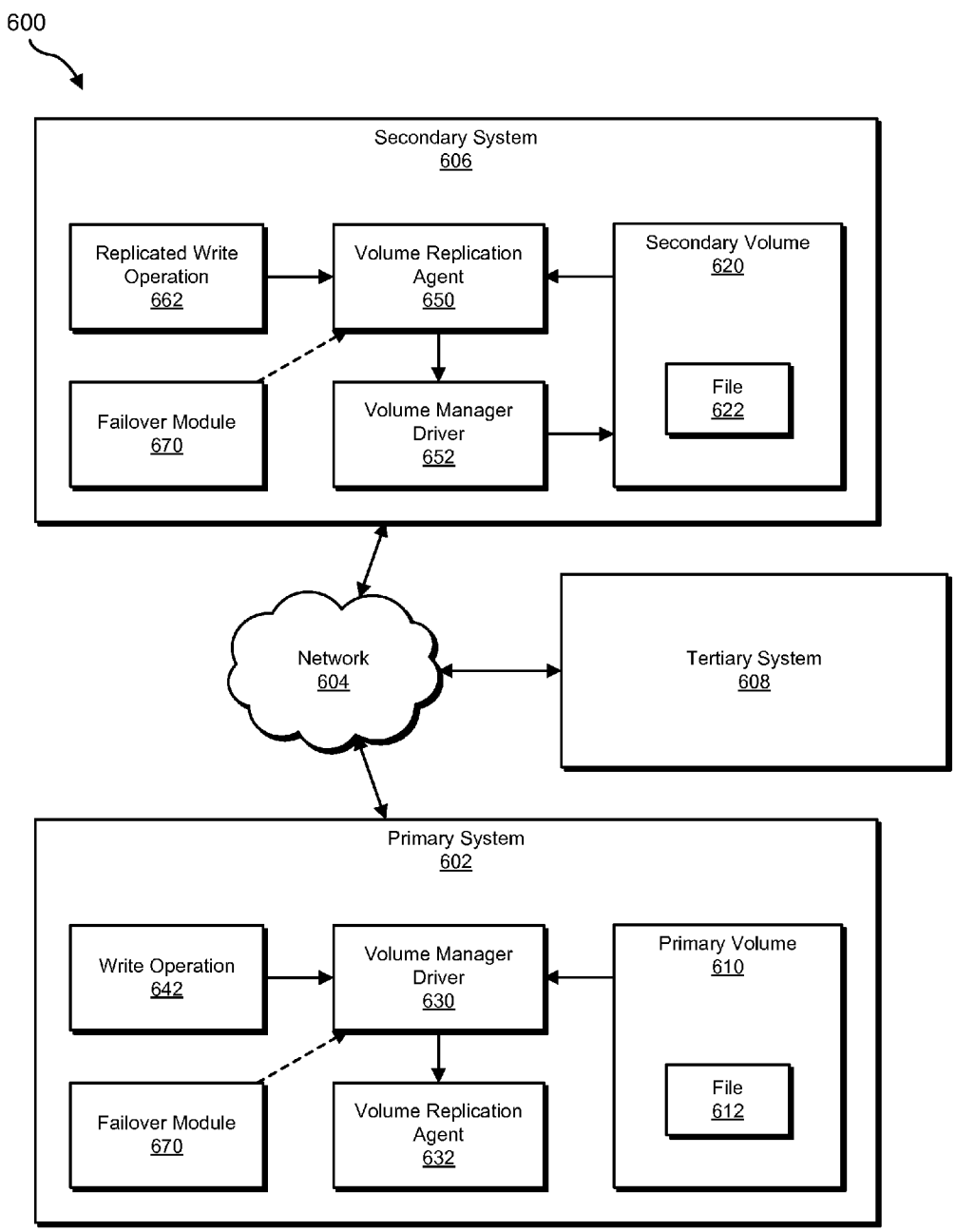
FIG. 6 is a block diagram of an exemplary system for file-level replication.

In some examples, the secondary volume may be configured as a failover volume, and the primary volume may fail. For example, FIG. 6 illustrates an exemplary system 600 for file-level replication. As shown in FIG. 6, exemplary system 600 may include a primary system 602, a secondary system 606, and a tertiary system 608 in communication via a network 604. Using FIG. 6 as an example, primary system 602 may be configured to replicate a selection of files from a primary volume 610 (e.g., including a file 612) to a secondary volume 620 (e.g., to a replica file 622). In this example, a volume manager driver 630 may intercept a write operation 642 destined for file 612 to prepare write operation 642 for replication to file 622. Volume manager driver 630 may modify write operation 642 to include file-level information and then allow volume replication agent 632 to replicate write operation 642 to secondary system 606 as a replicated write operation 662. A volume manager replication agent 650 may intercept replicated write operation 662 based on replicated write operation 662 applying to file 622. Volume manager replication agent 650 may then convert the file-level information in replicated write operation 662 to a volume location within secondary volume 620 (e.g., based on extent information for replica file 622) and forward the converted replicated write operation to a volume manager driver 652 to apply directly to secondary volume 620 (e.g., instead of via a file system). However, in one example, primary system 602 and/or primary volume 610 may fail. In this example, a failover module 670 may configure secondary system 606 to act as a new primary system, including reconfiguring volume manager replication agent 650 on secondary system 606 to perform the functions previously performed by volume manager replication agent 650 on primary system 602 (e.g., intercepting write operations and preparing file-level information to forward to a new secondary system). Tertiary system 608 may then act as a new secondary system, receiving replications from secondary system 606, now acting as a primary system.

As explained above, by filtering file operations for specified files on primary volumes, converting these operations to specify file offsets (e.g., from volume offsets), and replicating the converted operations to secondary volumes, the system and methods described herein may achieve file-level replication using existing volume-level replication technologies. For example, existing volume-level replication systems may be adapted with minimal change for file-level replication, thereby allowing file-level replication with volume-level replication systems that may provide features, robustness, performance, quality of service, and/or ease of use that may be unavailable with some traditional dedicated file-level replication systems.

Figure 7:
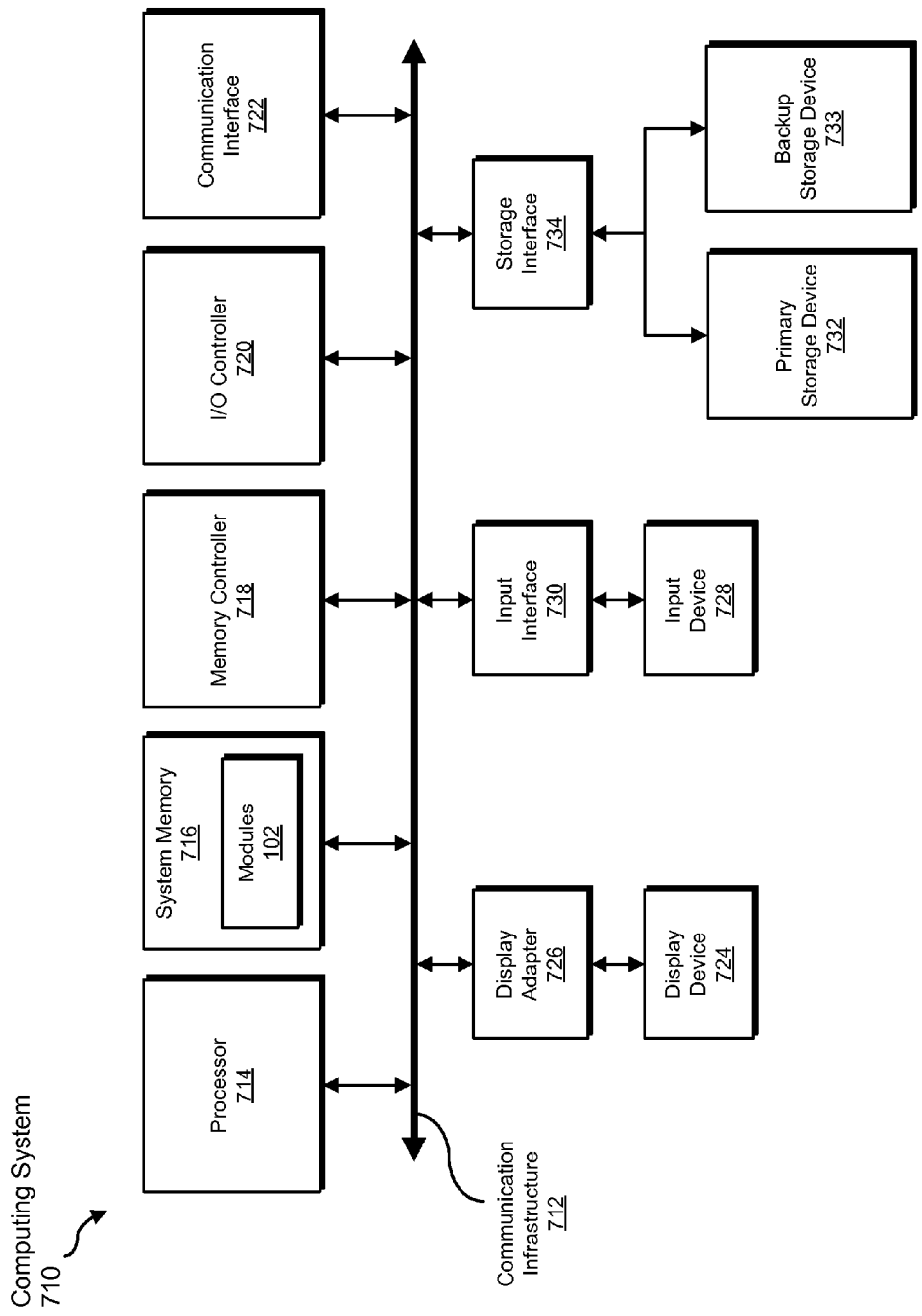
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, configuring, transmitting, comparing, determining, performing, converting, replicating, preventing, receiving, modifying, applying, and reconfiguring steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
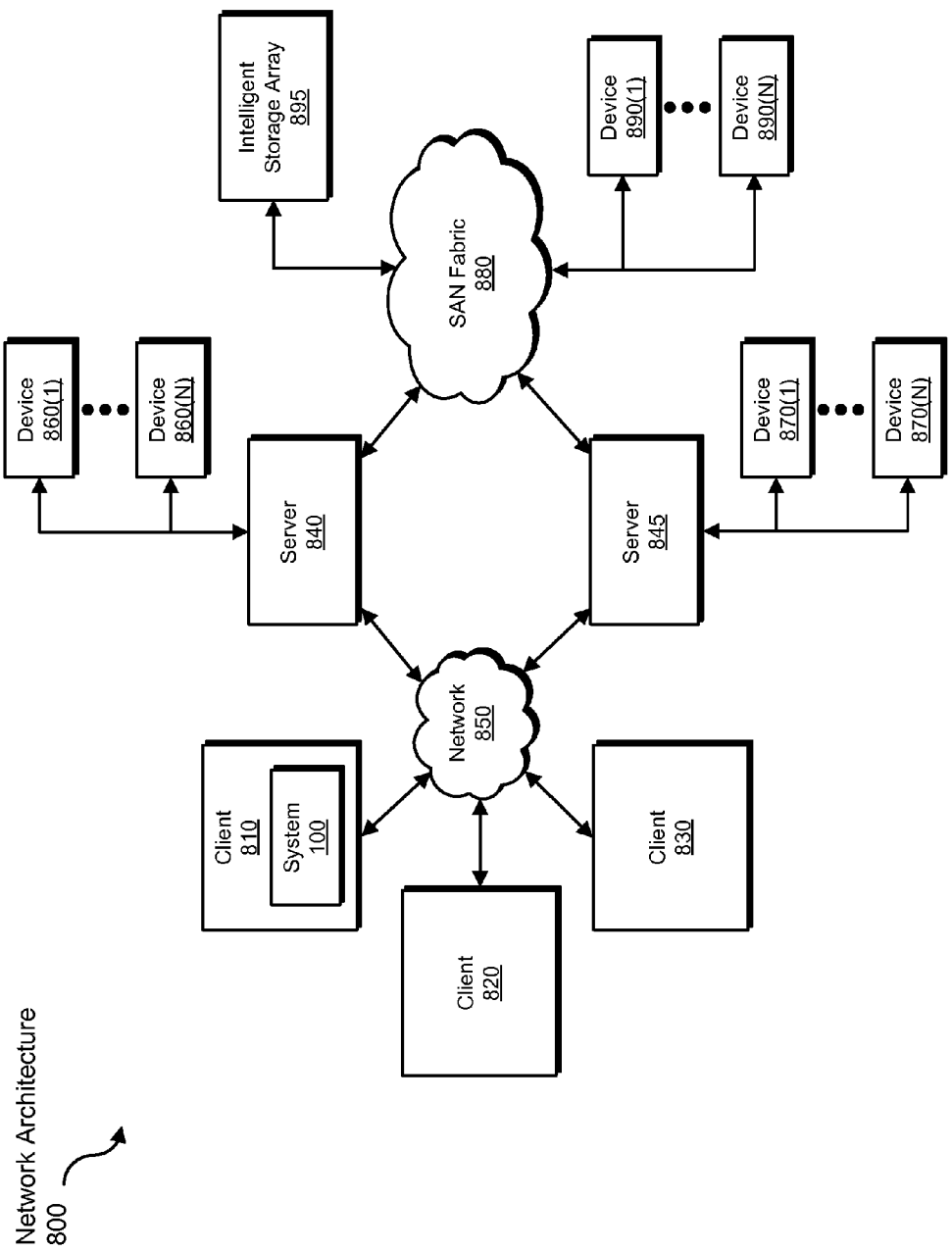
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, configuring, transmitting, comparing, determining, performing, converting, replicating, preventing, receiving, modifying, applying, and reconfiguring steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for file-level replication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a volume-level write location to be transformed, transform the write location to a file-level write location, output a result of the transformation to a secondary system, use the result of the transformation to replicate a write operation to a secondary volume, and store the result of the write operation to the secondary volume. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for file-level replication, at least a portion of the method being performed by a computing device comprising at least one processor, the method comprising:
identifying a selection of at least one source file to replicate from a primary volume to a secondary volume;
identifying extent information that indicates a volume location of the source file within the primary volume;
identifying a volume offset within the primary volume of a write operation performed on the source file within the primary volume;
converting the volume offset to a file offset within the source file using the extent information;
replicating the write operation and the file offset to the secondary volume.

2. The computer-implemented method of claim 1, wherein converting the volume offset to the file offset is performed based on an extent map that maps volume offsets to file offsets.

3. The computer-implemented method of claim 2, wherein:
the volume offset comprises a logical cluster number;
the file offset comprises a virtual cluster number.

4. The computer-implemented method of claim 1, wherein converting the volume offset to the file offset comprises subtracting the volume offset of the write operation from a volume location of an extent to which the write operation applies to determine an offset within the extent.

5. The computer-implemented method of claim 4, wherein converting the volume offset to the file offset further comprises, after subtracting the volume offset of the write operation from the volume location of the extent to which the write operation applies, adding a file offset of the extent to the determined offset of the extent to identify the file offset.

6. A computer-implemented method for file-level replication, at least a portion of the method being performed by a computing device comprising at least one processor, the method comprising:
identifying a target file on a secondary volume as a replicated version of a source file on a primary volume;
receiving a replicated write operation to apply to the target file on the secondary volume;
identifying extent information that indicates a volume location of the target file within the secondary volume;
identifying a file offset within the replicated write operation;
converting the file offset to a volume offset of the replicated write operation within the secondary volume using the extent information;
applying the replicated write operation on the secondary volume using the volume offset.

7. The computer-implemented method of claim 6, further comprising:
receiving new extent information that indicates a change in a size of the source file on the primary volume;
modifying the target file on the secondary volume to match the source file on the primary volume based on the new extent information.

8. The computer-implemented method of claim 7, wherein receiving the new extent information comprises configuring a file system filter driver to receive the new extent information for modifying the target file.

9. The computer-implemented method of claim 8, wherein the secondary volume is mounted to allow read operations and write operations for replication.

10. The computer-implemented method of claim 9, further comprising:
identifying a failover of the primary volume to the secondary volume;
reconfiguring the file system filter driver to intercept file operations that change metadata of the target file to replicate to a new secondary volume in response to identifying the failover.

11. A system for file-level replication, the system comprising:
an identification module programmed to identify a selection of at least one source file to replicate from a primary volume to a secondary volume;
a location module programmed to identify extent information that indicates a volume location of the source file within the primary volume;
an offset module programmed to identify a volume offset within the primary volume of a write operation performed on the source file within the primary volume;
a conversion module programmed to convert the volume offset to a file offset within the source file using the extent information;
a replication module programmed to replicate the write operation and the file offset to the secondary volume;
at least one processor configured to execute the identification module, the location module, the offset module, the conversion module, and the replication module.

12. The system of claim 11, wherein the location module is further programmed to:
identify new extent information that indicates a change in a size of the source file on the primary volume;
transmit the new extent information to the secondary volume.

13. The system of claim 11, wherein the location module is programmed to identify the extent information by receiving the extent information from a file system driver.

14. The system of claim 11, wherein:
the offset module is programmed to:
identify an additional write operation performed on the primary volume;
compare the additional write operation to the extent information and determine, based on the extent information, that the additional write operation does not apply to the source file;
the replication module is programmed to:
prevent replication of the additional write operation to the secondary volume based on determining that the additional write operation does not apply to the source file.

15. The system of claim 11, wherein the identification module is programmed to identify the selection of the source file to replicate from the primary volume to the secondary volume by configuring a file system filter driver to identify future file operations performed on the source file.

16. The system of claim 11, further comprising:
a target-identification module programmed to identify a target file on the secondary volume as a replicated version of the source file on the primary volume;
a target-receiving module programmed to receive a replicated write operation to apply to the target file on the secondary volume;
a target-location module programmed to identify target file extent information that indicates a target volume location of the target file within the secondary volume;

a target-offset module programmed to identify the file offset of the replicated write operation;

a target-conversion module programmed to convert the file offset to a target volume offset of the replicated write operation within the secondary volume using the target file extent information;

a target-application module programmed to apply the replicated write operation on the secondary volume using the target volume offset.

17. The system of claim 16, wherein the target-location module is further programmed to:

receive new extent information that indicates a change in a size of the source file on the primary volume;

modify the target file on the secondary volume to match the source file on the primary volume based on the new extent information.

18. The system of claim 17, wherein the target-location module is programmed to receive the new extent information by configuring a file system filter driver to receive the new extent information for modifying the target file.

19. The system of claim 18, wherein the secondary volume is mounted to allow read operations and write operations for replication.

20. The system of claim 19, further comprising a failover module programmed to:

identify a failover of the primary volume to the secondary volume;

reconfigure the file system filter driver to intercept file operations that change metadata of the target file to replicate to a new secondary volume in response to identifying the failover.

* * * * *